United States Patent [19]

Oudet

[11] Patent Number: 4,517,478
[45] Date of Patent: May 14, 1985

[54] ELECTRIC STEPPER MOTOR

[75] Inventor: Claude Oudet, Besancon, France

[73] Assignee: Portescap, La Chaux-de-Fonds, Switzerland

[21] Appl. No.: 596,442

[22] Filed: Apr. 3, 1984

[30] Foreign Application Priority Data

Apr. 8, 1983 [CH] Switzerland ............... 1913/83

[51] Int. Cl.³ .................................... H02K 37/00
[52] U.S. Cl. ................................ 310/49 R; 310/268
[58] Field of Search ............ 310/49, 162–165, 310/268, 156

[56] References Cited

U.S. PATENT DOCUMENTS

| | | | |
|---|---|---|---|
| 3,784,850 | 1/1974 | Inaba et al. | 310/49 |
| 3,803,431 | 4/1974 | Inaba et al. | 310/49 |
| 3,860,842 | 1/1975 | Schwab | 310/49 |
| 4,387,312 | 6/1983 | Oudet | 310/49 |

Primary Examiner—Donovan F. Duggan
Attorney, Agent, or Firm—Cushman, Darby & Cushman

[57] ABSTRACT

An electric stepper motor of the type comprising an axially magnetized rotor disc and a plurality of elemental magnetic stator circuits is disclosed. Each elemental circuit is formed of two U-shaped portions arranged opposite each other, one of each U being in contact with the opposite U-end and the second U-end being spaced from the opposite one to form an air gap for the rotor disc, the centers of the ends forming the airgap being angularly shifted with respect to each of the U-ends in contact with each other so as to compensate the third and/or fifth harmonics in the torque due to the driving current.

2 Claims, 3 Drawing Figures

ELECTRIC STEPPER MOTOR

The invention relates to an electric stepper motor of the type comprising a rotary member formed essentially of a disc of magnetic material magnetized axially so as to present on each side of the disc 2N magnetic poles of alternate polarity arranged uniformly along an annular zone, the said rotary member being mounted on the shaft of the motor, the motor comprising in addition a plurality of elemental magnetic circuits which as a whole form at least two groups, and at least two electric coils each coupled to a number of elemental circuits belonging to one and the same group, each of these elemental magnetic circuits exhibiting an airgap, all of the airgaps being formed at the same radial distance from the motor shaft and each airgap being in addition substantially symmetrical with respect to the radial plane of symmetry of the magnetized disc, each elemental magnetic circuit including a first and a second flat U-shaped portion of stator of high magnetic permeability arranged essentially radially with respect to the motor shaft, the end of a first arm of the U of a first portion of stator in each circuit being arranged in contact with the end of the first arm of the U of a second portion of stator in the same circuit, the ends of the second arms of the U's of the first and second portions of stator being arranged essentially facing one another at a certain axial distance apart so as to form one of the said airgaps, the said electric coils being arranged respectively round the two arms of the U's of the said first and second portions of stator in the elemental magnetic circuits with which they are coupled. Such a motor is described, for example, in U.S. Pat. No. 4,330,727.

In motors of this type it is desirable to be able to minimize the harmonics in the torque due to the current and those in the torque which exist in the absence of current.

Accordingly, it has already been proposed to divide each group of elemental magnetic circuits associated with one phase of a two-phase motor into two sub-groups and to offset these sub-groups with respect to one another so as to compensate the fourth harmonic in the torque in the absence of current.

In certain applications, and especially when the motor is controlled so as to carry out fractional steps, an operation called "microstepping", it appears, however, that also other harmonics, in particular the third and fifth harmonics in the torque due to the current, become very troublesome, so that attempts have been made to employ the same principle of offsetting sub-groups of elemental circuits in order to compensate these harmonics. In connection with the motor described in the U.S. patent application Ser. No. 530,585/1982, examples have been given in order to illustrate the application of such measures to a motor comprising magnetic circuits of the type described in this patent. The same principle is equally applicable to a motor exhibiting magnetic circuits such as are described in the above-mentioned U.S. Pat. No. 4,330,727.

In this latter case, however, if one tries to shift the two stator halves arranged on opposite sides of the transverse plane containing the magnetized disc, the losses in flux resulting from such shifting or offset, in the elemental circuits which are of small thickness, become in practice prohibitive. Nevertheless, in principle, the said offset constitutes a particularly effective measure of harmonic compensation, which in addition enables subdivision into respective sub-groups to be employed simultaneously for compensating other harmonics.

The main object of the invention is to provide a motor of the type mentioned at the beginning, which enables harmonic compensation to be achieved by an angular offset of the two stator halves without significant loss of flux.

In accordance with the invention, in a motor of this type, the centre of the end of the second arm of the U of each portion of stator in one elemental magnetic circuit is offset angularly with respect to the centre of the end of the first arm of the U and the two portions of stator in one elemental magnetic circuit are arranged so that the centres of the ends of the first arms of the U's coincide and that the centres of the ends of the second arms of the U's are offset angularly with respect to one another by an angle substantially equal to $\pi/hN$ where h is the order of the harmonic which is to be compensated. Preferably, furthermore, the centres of the ends of the first or second arms of the U's of the portions of stator in two elemental magnetic circuits coupled with the coil or coils of one and the same phase, are offset angularly so as to compensate a desired harmonic.

Additional features and objects of the invention will become apparent from the description of a preferred embodiment given hereunder by way of example and illustrated in the attached drawings in which.

Figure 1:
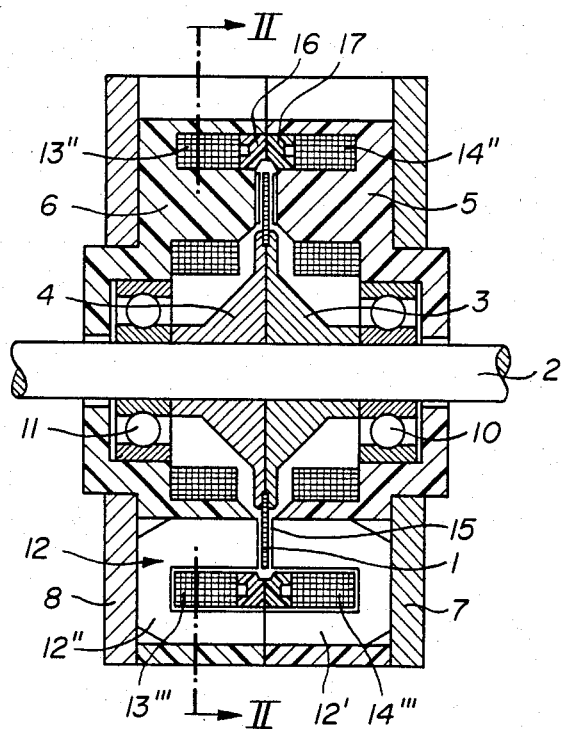
FIG. 1 is an axial section of a two-phase stepper motor in accordance with the invention, the section following the line I—I in FIG. 2.
Figure 2:
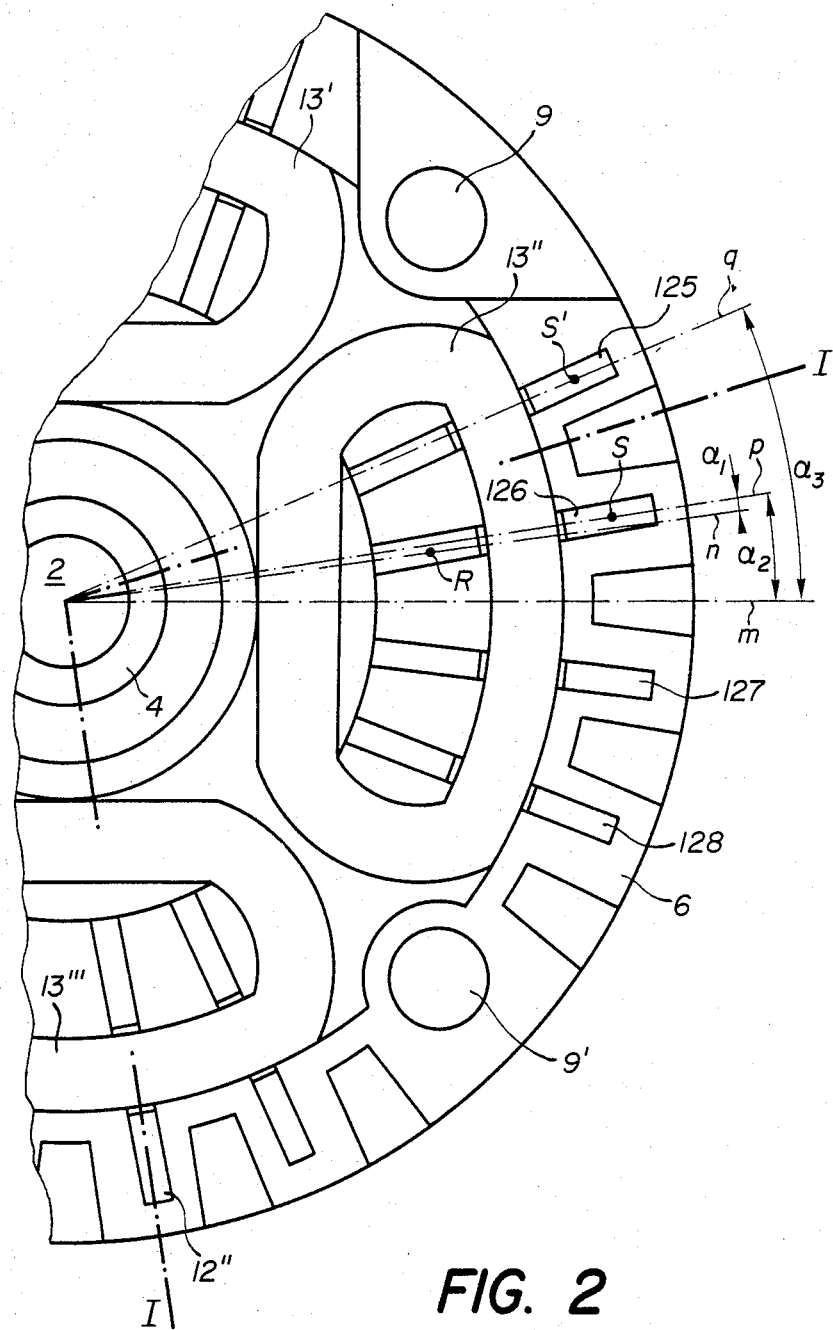
FIG. 2 is a section through the motor along the line II—II in FIG. 1.

The stepper motor represented in FIGS. 1 and 2 includes a rotary member 1 in the form of an annular disc mounted on a shaft 2 by means of two supporting portions 3, 4. The portions 3, 4 are fixed onto the shaft 2 and support at their peripheral portion a thin permanent magnet forming the member 1. The latter is magnetized axially and presents on each side of the disc 2N magnetic poles of alternate polarity arranged uniformly along an annular zone.

As shown in FIG. 1, the present embodiment of the motor is practically symmetrical with respect to a transverse plane containing the rotary member 1. Two stator supports 5, 6 of non-magnetic material, for example of plastics, are arranged facing one another and assembled by means of annular cheeks 7, 8 and screws 9, 9', etc. The motor shaft 2 is mounted for rotation with respect to the supports 5, 6 by means of bearings 10, 11. A number of elemental magnetic circuits 12 as well as electric coils 13', 13'', 13''', 13'ᵥ (not shown) and 14' (not shown), 14'', 14''', 14'ᵥ (not shown) are supported by the supports 5, 6.

Each elemental magnetic circuit 12 includes two portions of stator 12', 12'' of U-shape, produced from a material of high magnetic permeability and arranged radially and opposite one another in the axial direction. In greater detail, a first outer arm of the U of each first portion of stator 12' is in contact by the end of it with the corresponding end of a first arm of the U of a second portion of stator 12'', whereas the two inner arms of the U of these same portions of stator exhibit ends spaced from one another so as to form an airgap 15 between them. The portions of stator may be produced from one piece of soft iron or in order to improve the quality of the circuit, in a lamellar form.

As is evident from FIG. 2, the elemental magnetic circuits are divided into four groups each comprising four elemental magnetic circuits, two groups being associated with each of the phases and the groups associated with one and the same phase being arranged diametrically opposite one another. Thus each phase includes two pairs of coils, namely, 13', 14' and 13''', 14''' for the one phase and 13'', 14'' and 13'$^{iv}$, 14'$^v$ for the other. The coils associated with each phase are arranged diametrically opposite one another in each half of the complete stator of the motor. These stator halves consist of the portions arranged on opposite sides of the plane containing the rotary member 1. Two coils diametrically opposed in the half of the stator including the support 6 may be partially seen in FIG. 2 and have been designated by 13' and 13'' respectively.

The elemental magnetic circuits are spaced angularly with respect to one another by an angle at least approximately equal to $2k\pi/N$ where k is a whole number and N is the number of pairs of poles on the rotor.

As shown in FIGS. 1 and 2, two electric coils are coupled to each elemental magnetic circuit 12 and the circuits of each group are coupled as a whole to two corresponding coils such as 13', 14'. The coils are arranged round the arms of the U, which form the airgaps in the elemental circuits and their shape as shown in FIG. 2 ensures that the turns are located relatively near to these arms of the U. Again, the cross-section of the coils fills practically entirely the space between the two arms of the U of each portion of stator. There are only two rings 16, 17 likewise located in this space in order to keep the coils in place and in order to guide the connecting leads from them.

The arrangement described above provides excellent coupling between the coils and the corresponding elemental circuits, a minimum length of the lines of magnetic flux inside the circuits and extremely low coupling between the coils associated respectively with the two phases.

Figure 3:
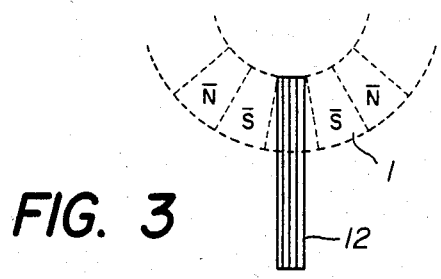
FIG. 3 is a view in the axial direction of an elemental magnetic circuit without coil, showing diagrammatically one portion of the rotary member cooperating with this circuit.

FIG. 3 shows separately an elemental magnetic circuit 12, realized, for example, in lamellar form, one arm of the U of each portion of stator forming the airgap in the manner described above. FIG. 3 further shows diagrammatically a peripheral annular zone of the disc 1 of hard magnetic material magnetized axially so as to present the said 2N magnetic poles of alternate polarity on each side of the annular disc, these poles being indicated by "$\overline{N}$" and "$\overline{S}$".

FIG. 2 illustrates the specific arrangement of the present motor. It shows the distribution of the second portions of stator 12'' in the elemental magnetic circuits, the corresponding first portions being arranged as described above. The centres of the ends of the first and second arms of the U of one of these second portions of stator have been designated and indicated in the plane of these ends by S and R respectively.

The centres R and S are offset angularly with respect to one another by an angle $\alpha_1$ corresponding with half of the angular offset which will provide compensation of the desired harmonic. With the designations from FIG. 2, the angle $\alpha_1$ is the angle between the axial planes n and p. The offset is similar and in the same direction for all of the portions of stator of one and the same stator half. As far as the second half of the stator is concerned, the offset has the same value and takes place in a direction such that upon assembly of the two stator halves the two offsets add up. More precisely, the ends of the first arms of the U's or outer arms will be superimposed in the two stator halves upon assembly, whereas the centres of the corresponding second inner arms are offset by an angle of $2\alpha_1$ with respect to one another. Thus for the polar parts of the stator which form the airgap, an offset is obtained which achieves compensation of the desired harmonic. For example, in the case of the fourth harmonic of the residual torque, that is to say, of the torque being exerted upon the rotor in the absence of electric current in the coils, because of the interaction of the magnetic poles of the magnetized disc with the polar parts of the stator, $2\alpha_1$ will be chosen to be substantially equal to $\pi/4N$. In general, the offset $2\alpha_1$ is chosen to be substantially equal to $\pi/hN$, where h is the order of the harmonic which is to be compensated. It has proved to be preferable, from experience, to increase the offset by about 10% with respect to the theoretical value in order to ensure very good compensation, taking into account the actual distortions of the magnetic field.

This compensation measure may advantageously be combined with compensation measures inside each stator half by an offset of the respective axial planes of symmetry of the polar portions of each group of polar portions. For example, in the case of FIG. 2, the third order harmonic of the torque due to the electric current is compensated by an offset of the axial planes indicated by q and p with respect to an axial plane m which is a plane of symmetry for the ends of the outer arms of the portions of stator. In the arrangement shown, the centres S' and S are situated in planes q and p such that with respect to m the angles $\alpha_2 = \pi/N$ and $\alpha_3 = 3\pi/N + \pi/6N$, that is to say, such that the axial plane of symmetry between the two centres is offset with respect to the plane m by $\pi/6N$, or by half of the angle of compensation for the third harmonic, the other half being obtained by a similar offset of the centres symmetrical with S' and S with respect to the plane m.

In order to compensate at one and the same time the third and fifth harmonics inside one group of four polar parts, the axial planes of symmetry such as p and q of two consecutive polar parts are offset from one another in the direction circumferential to the motor to form subgroups 125, 126 and 127, 128 so as to compensate the effect of the third harmonic. In other words, the planes of symmetry of the polar parts 125, 126 and 127, 128 are offset by $\pm\pi/5N$ with respect to their theoretical position corresponding, for example, with an angle of $2\pi/N$ between these planes of symmetry, and the axial planes of symmetry of the sub-groups 125, 126 and 127, 128, each considered as a whole, are offset with respect to one another by an angle of $\pm\pi/3N$. The whole of these offsets is carried out in such a way that the resulting displacements with respect to the theoretical position of the polar parts are the smallest. Thus, in the present example, the signs of the angles of offset are chosen so as to bring nearer together the polar parts inside each sub-group and to bring the two sub-groups towards one another, which results in respective angles of $(2\pi - \pi/5)/N$, $(2\pi - \pi/3 + \pi/5)/N$ and $(2\pi - \pi/5)/N$ between the consecutive planes of symmetry inside the group of four polar portions.

It is obvious for one skilled in the art that the desired compensation may be achieved similarly in the case of a different number of polar parts and that this compensation will be an optimum if there are available an even number of sub-groups and an even number of polar parts in each sub-group.

It should be observed that the inclination of the inner ends of the arms of the U's of the portions of stator with respect to an axial plane secures a certain reduction in harmonics of the fifth order and higher, which in the majority of cases enables the compensation inside each stator half to be limited to that of the third harmonic.

I claim:

1. An electric stepper motor comprising a rotary member formed essentially of a disc of magnetic material magnetized axially so as to present on each side of the disc 2N magnetic poles of alternate polarity arranged uniformly along an annular zone, the said rotary member being mounted on the shaft of the motor, the motor comprising in addition a plurality of elemental magnetic circuits which, as a whole, form at least two groups, and at least two electric coils each coupled to a number of elemental circuits belonging to one and the same group, each of these elemental magnetic circuits exhibiting an airgap, all of the airgaps being formed at the same radial distance from the motor shaft and each airgap being in addition substantially symmetrical with respect to the radial plane of symmetry of the magnetized disc, each elemental magnetic circuit including a first and a second flat U-shaped portion of stator of high magnetic permeability arranged essentially radially with respect to the motor shaft, the end of a first arm of the U of a first portion of stator in each circuit being arranged in contact with the end of the first arm of the U of a second portion of stator in the same circuit, the ends of the second arms of the U's of the first and second portions of stator being arranged essentially facing one another at a certain axial distance apart so as to form one of the said airgaps, the said electric coils being arranged respectively round the two arms of the U's of the said first and second portions of stator in the elemental magnetic circuits with which they are coupled, the centre of the end of the second arm of the U of each portion of stator in one elemental magnetic circuit being offset angularly with respect to the centre of the end of the first arm of the U and the two portions of stator in one elemental magnetic circuit being arranged so that the centres of the ends of the first arms of the U's coincide and that the centres of the ends of the second arms of the U's are offset angularly with respect to one another by an angle substantially equal to $\pi/hN$ where h is the order of the harmonic which is to be compensated.

2. A motor in accordance with claim 1, wherein the centres of the ends of the first or second arms of the U's of the portions of stator in two elemental magnetic circuits coupled with the coil or coils of one and the same phase, are offset angularly so as to compensate a desired harmonic.

* * * * *